US005499360A

United States Patent [19]
Barbara et al.

[11] Patent Number: 5,499,360
[45] Date of Patent: Mar. 12, 1996

[54] METHOD FOR PROXIMITY SEARCHING WITH RANGE TESTING AND RANGE ADJUSTMENT

[75] Inventors: Daniel Barbara, Princeton, N.J.; Stephen Johnson, Erdenheim, Pa.; Sharad Mehrotra, Plainsboro; Walid Aref, Monmouth Junction, both of N.J.

[73] Assignee: Panasonic Technolgies, Inc., Princeton, N.J.

[21] Appl. No.: 203,329

[22] Filed: Feb. 28, 1994

[51] Int. Cl.$^6$ .................................... G06F 17/30
[52] U.S. Cl. .................. 395/600; 364/DIG. 1; 364/282.1; 364/282.3
[58] Field of Search ............................... 395/600

[56] References Cited

U.S. PATENT DOCUMENTS

| | | | |
|---|---|---|---|
| 4,118,788 | 10/1978 | Roberts | 364/DIG. 2 |
| 4,255,796 | 3/1981 | Gabbe et al. | 364/DIG. 2 |
| 4,479,196 | 10/1984 | Ferrer et al. | 364/DIG. 2 |
| 4,490,811 | 12/1984 | Yianilos et al. | 364/DIG. 2 |
| 4,625,295 | 11/1986 | Skinner | 364/DIG. 2 |
| 4,747,072 | 5/1988 | Robinson et al. | 364/DIG. 2 |
| 4,774,655 | 9/1988 | Kollin et al. | 364/DIG. 1 |
| 4,796,003 | 1/1989 | Bentley et al. | 364/DIG. 2 |
| 4,870,568 | 9/1989 | Kahle et al. | 364/DIG. 1 |
| 4,941,124 | 7/1990 | Skinner, Jr. | 364/DIG. 2 |
| 4,972,349 | 11/1990 | Kleinberger | 364/DIG. 2 |
| 5,005,137 | 4/1991 | Ernst | 364/DIG. 1 |
| 5,062,074 | 10/1991 | Kleinberger | 364/DIG. 2 |
| 5,167,011 | 11/1992 | Priest | 395/54 |
| 5,204,958 | 4/1993 | Cheng et al. | 395/600 |
| 5,206,949 | 4/1993 | Cochran et al. | 395/600 |
| 5,220,625 | 6/1993 | Hatakeyama et al. | 382/54 |
| 5,220,625 | 6/1993 | Hatakeyama et al. | 382/54 |
| 5,278,980 | 1/1994 | Pederson et al. | 395/600 |
| 5,404,513 | 4/1995 | Powers et al. | 395/600 |

OTHER PUBLICATIONS

Sun et al, "Dynamic Query Range For Multikey Searching", Proc. Fourteenth Annual International Computer Software and Applications Conf. IEEE, Nov. 2, 1990.

Jon L. Bentley et al, "Data Structures for Range Searching", Published in ACM Computing Surveys, vol. 11, No. 4, Dec. 1979, pp. 397–409.

David Dobkin and Richard J. Lipton, "Multidimensional Searching Problems", Published in Siam Journal on Computing, vol. 5, No. 2, Jun. 1976, pp. 181–186.

(List continued on next page.)

*Primary Examiner*—Thomas G. Black
*Assistant Examiner*—Wayne Amsbury
*Attorney, Agent, or Firm*—Ratner & Prestia

[57] ABSTRACT

A method of searching a database having a plurality of objects is provided. Each object includes attributes and, for each attribute, a number of values. A query specifies two attributes and a maximum distance. A respective set of ranges is established for each object that has a value for the first attribute. Each set includes a range for each value of the first attribute. Each range is defined by minimum and maximum location values. A test range is established for one of the ranges. The test range has values equal to the minimum and maximum values of one of the ranges. The test range is adjusted, if necessary, so that it includes one of the values of the second attribute of the corresponding object. The test range is added to a group of ranges corresponding to the object if the minimum and maximum test values do not differ from one another by more than the maximum distance. The steps of (1) establishing a test range, (2) adjusting the test range and (3) adding the test range to the group are repeated for each range in the set of ranges corresponding to the one object. Steps (1) to (3) are repeated for each value of the second attribute of each respective object for which a set of ranges is established. Each object for which the group of ranges includes at least one range is identified as being found by the searching.

16 Claims, 5 Drawing Sheets

OTHER PUBLICATIONS

Larry S. Davis and Nicholas Roussopoulos, "Approximate Pattern Matching in a Pattern Database System", Published in Information Systems, vol. 5, No. 2, 1980, pp. 107–119.

Udi Manber et al., "An algorithm for string matching with a sequence of don't cares", Published in Information Processing Letters, vol. 37, No. 3, Feb. 18, 1991, pp. 133–136.

Ronald L. Rivest, "Partial–Match Retrieval Algorithms", Published in Siam Journal on Computing, vol. 5, No. 1, Mar. 1976, pp. 19–50.

Hanan Samet, "The Quadtree and Related Hierarchical Data Structures", Published in ACM Computing Surveys, vol. 16, No. 2, Jun. 1984, pp. 187–260.

Michael Stonebraker et al., "Document Processing in a Relational Database System", Published in ACM Transactions on Office Information Systems, vol. 1, No. 2, Apr. 1983, pp. 143–158.

Gideon Yuval, "Finding Near Neighbours in K–Dimensional Space", Published in Information Processing Letters, vol. 3, No. 4, Mar 1975 pp. 113–114.

METHOD FOR PROXIMITY SEARCHING WITH RANGE TESTING AND RANGE ADJUSTMENT

FIELD OF THE INVENTION

The present invention relates to database searching generally, and more particularly to methods for performing proximity searches within a database.

BACKGROUND OF THE INVENTION

Database management systems (DBMS's) are well known. A database comprises a collection of data objects. Each object is defined by one or more attributes, which describe the object. Two or more different objects within a database may have the same attributes. The attributes may have one or more values, which may be quite complex. The objects are typically indexed by their attributes. For example, given an attribute value, a list of objects that have the same attribute and the same attribute value may be created.

A common example is a database in which the objects are documents. Because documents are most often identified by searching for keywords (i.e., the words contained in the document), it is common to use the keywords as attributes for indexing the document. The position of a given keyword within a document is the value of the keyword attribute. If the keyword appears two or more times in the document, the keyword attribute has two or more values. If the same keyword appears in a second document (object), then the second document has an attribute for the same keyword, with a respective position (attribute value).

It is frequently necessary to search a database for a pair of words within proximity to one another. For example, if the user wishes to query the database about the Governor of Pennsylvania, the desired information might appear in a document as "Governor of Pennsylvania" or "Pennsylvania Governor". To find documents that include either phrase, the user queries the database for documents in which "Pennsylvania" and "Governor" appear in any order within two words of one another.

In prior art database querying methods known to the inventors, proximity searching has only been performed on up to two strings at a time.

Alternate database querying methods are desired, by which proximity searches may be extended to allow document search queries that include three or more keywords.

SUMMARY OF THE INVENTION

The present invention is a method of searching a database having a plurality of objects. Each object includes (1) a subset of a plurality of attributes and, (2) for each attribute in the subset, a number of values stored in a storage medium.

A query is formed specifying first and second attributes and a maximum difference value. The maximum difference value defines a relative range of attribute values that satisfy the query.

A plurality of ranges is established. The plurality of ranges comprises a respective set of ranges and a respective group of ranges for each respective object that has at least one value for the first attribute. Each set of ranges includes a range for each respective value of the first attribute. Each range is defined by respective minimum and maximum location values.

A test range is established for one of the set of ranges corresponding to a respective one of the objects. The test range has minimum and maximum test values equal to the respective minimum and maximum values of the one range.

The test range is adjusted, so that a respective one of the values of the second attribute of the one object is included in the test range, if the one value is not between the minimum and maximum test values.

The test range is added to the group of ranges corresponding to the one object if the minimum and maximum test values do not differ from one another by more than the maximum difference value.

The steps of establishing a test range, adjusting the test range and adding the test range to the group are repeated for each respective range in the set of ranges corresponding to the one object.

The steps of establishing a test range, adjusting the test range, adding the test range to the group and repeating for each range in the set are repeated for each respective value of the second attribute of each respective object for which a set of ranges is established.

Each respective object for which the respective group of ranges includes at least one range is identified as being found by the searching.

OVERVIEW

The present invention provides an efficient method for performing proximity searches within a database. Although the invention may be practiced for databases that include a variety of different quantifiable attributes, (e.g., position, time, temperature, field intensity, frequency, etc), for simplicity, the first exemplary embodiment is described in this overview section only with respect to keyword proximity searching, which involves one-dimensional position attributes.

The database for this exemplary embodiment of the invention has a plurality of objects, or documents. Each document has a plurality of attributes, defined by keywords. Each keyword has a number of values that are stored in a storage medium. Each value indicates a respectively different location of the keyword within the document in which the keyword appears. If the keyword does not appear in the document, the number of values of the attribute for that document is zero. The database is stored in a conventional storage medium, such as disk or tape. It is assumed that the database has already been created by a conventional method, such as reading the data from a mass storage device, generating the data using a computer program, entering data manually, or a combination of the three.

An example of such a database is shown in Table 1. Table 1 is a summary of a database having four documents. Three keywords, "dog", "cat" and "ant" are used. The table indicates the position within each document of the respective keyword. For example, "dog" is found in document 1 at the 6th, 20th and 50th positions.

TABLE 1

| | Exemplary Database | | | |
|---|---|---|---|---|
| KEYWORD | DOC 1 | DOC 2 | DOC 3 | DOC 4 |
| dog | 6 | 30 | | 100 |
| | 20 | | | 130 |
| | 50 | | | |
| cat | 18 | 27 | 23 | 131 |
| | | 33 | 81 | |
| ant | 15 | 19 | 16 | 104 |
| | | 34 | | 150 |
| | | 112 | | |

Figure 1:
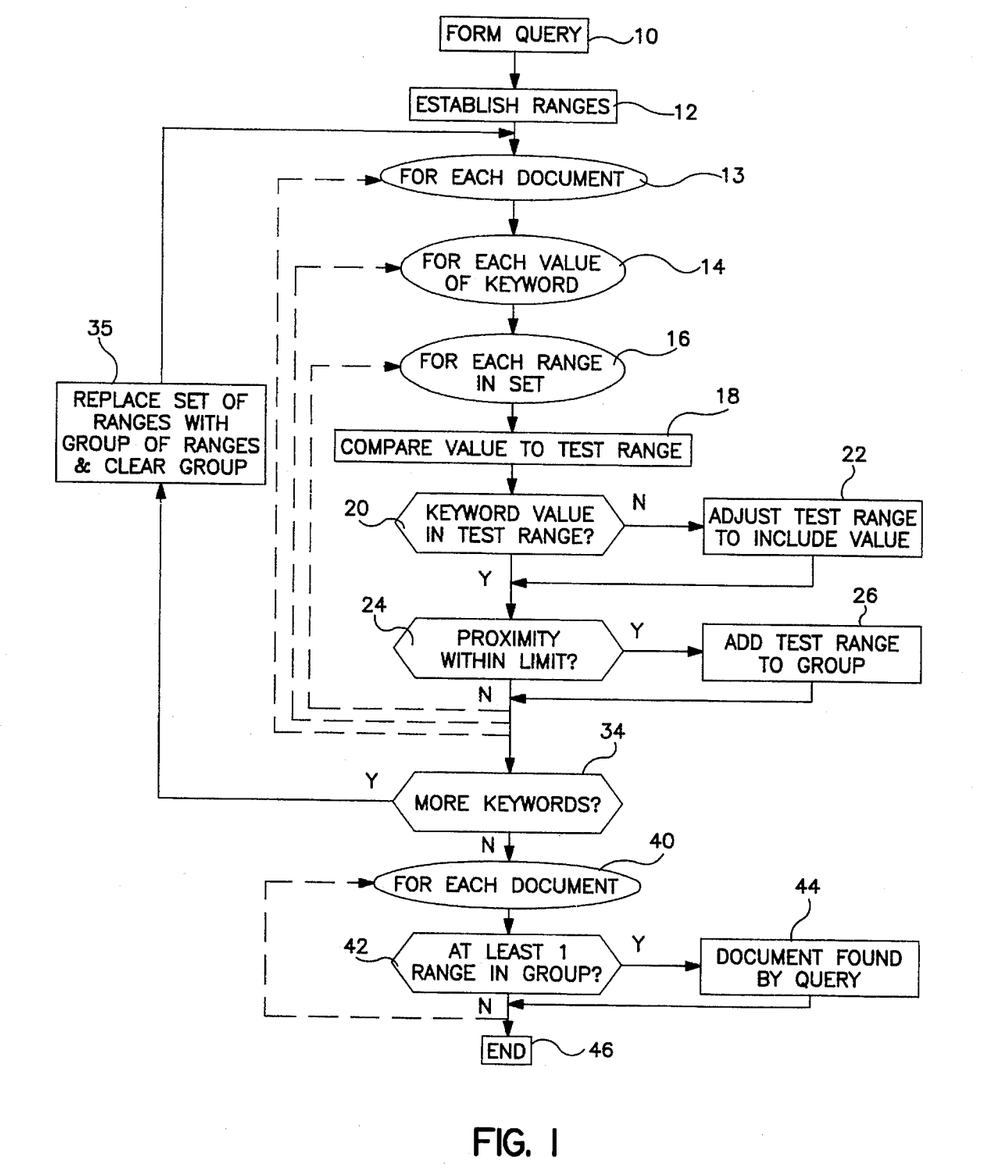
FIG. 1 is a flow chart diagram of a first exemplary method of keyword searching in accordance with the invention.

Referring now to FIG. 1, at step 10, a query is formed. The query specifies first and second keywords and a maximum distance defining a relative range of keyword locations that satisfy the query. Although the query may include other parameters, for purpose of explaining the invention, only the keywords and maximum distance are considered. In the first example, the purpose of the query is to find all documents in which "dog" and "cat" appear within five words of one another. The query specifies the first keyword "dog", the second keyword, "cat", and a maximum separation of 5 words.

At step 12, a plurality of ranges is established. The plurality of ranges includes a set of ranges for each respective document in which the first keyword appears at least once. Each set of ranges includes a range for each respective location of the first keyword within the respective document. Each range is defined by respective minimum and maximum location values.

In the example, the first keyword is "dog". Documents 1, 2 and 4 each have a value for "dog", but document 3 has no value for "dog". Sets of ranges are established for respective documents 1, 2 and 4. With respect to document 1, a set including three ranges is established, one range for each instance of the keyword "dog". The minimum and maximum values for each respective range are initialized to the same value. Thus the initial ranges are (6,6), (20, 20) and (50, 50) for the set of ranges corresponding to document 1. Similarly a set having one range, (30, 30), is established for document 2; and a set of ranges including (100, 100) and (130, 130) is established for document 4.

Once the sets of ranges are established, at steps 13, 14 and 16, a loop is executed in which each position of the second keyword "cat" in each document (documents 1, 2 and 4) is compared to each range in the respective set for that document. At steps 18–22, a test range is formed that has the same boundaries as one of the ranges in the respective set. At step 22, the test range is adjusted, if necessary, so that the test range includes both the first and second keywords. (The test range is adjusted, not the original range in the set, so that the original range is retained in the set for comparison with other values of the second keyword, until all of the values are compared to the range). At step 24, if the test range satisfies the proximity criterion (i.e., the minimum and maximum values of the test range are separated by not more than five words), then at step 26 the test range is saved as a member of a new group of ranges for that document.

Applying steps 14–26 in the present example, the "cat" position 18 is compared to each range. At step 18, the value 18 is compared to the range (6, 6) for document 1. At step 20, the value 18 is outside of the range. At step 22, a test range (6, 18) is formed, including the minimum boundary of the range (6, 6), as well as the value 18. At step 24, the difference between the minimum and maximum values of (6, 18) is greater than 5, so a test range (6, 18) would not satisfy the five word limit. Step 26 is not executed, and (6, 18) is not added to the group of ranges.

Steps 18–24 are repeated for the range (20, 20). The value 18 is outside of a test range (20, 20), so at step 22, the test range is adjusted to (18, 20). At step 24, the value 18 is within 5 words of 20, so at step 26, the second test range (18, 20) satisfies the proximity criterion and is saved in the new group of ranges for document 1. Steps 18–24 are then repeated for the range (50, 50). At step 24, the value 18 is more than 5 words from 50, so a test range (18, 50) would not satisfy the five word limit. As a result, the new group of ranges for document 1 only includes the range (18, 20).

Executing steps 14–26 for document 2, the values 27 and 33 for "cat" are compared to the set of ranges for "dog" corresponding to document 2. There is only one range (30, 30) in the set of ranges, but there are two occurrences of the second keyword. The values 27 and 33 are each located within five words of the minimum and maximum values of the range (30, 30). Thus, when steps 16–26 are executed twice, respectively different test ranges (27, 30) and (30, 33) are created, and each of these test ranges satisfies the proximity criterion.

Note that when steps 16–26 are executed the second time, the value 33 is compared to the range (30, 30) from the set of ranges, and is not compared to the new range (27, 30) from the group of ranges. If the latter comparison were performed, the test range could not be adjusted to (27, 33) without violating the proximity criterion, because the minimum and maximum values of the range would differ by more than the maximum distance of five. For a query including only two keywords, the identification of a second range in the new group of ranges has no effect on whether document 2 satisfies the query. As explained below, the difference may be significant if the query involves more than two keywords.

Similarly, executing steps 14–26 for document 4, to test the positions of the keyword "cat" in that document, a new group including the single range (130, 131) satisfies the proximity requirement, and is thus found by the query.

In the present example, the only document that does not include any range in the new group of ranges is document 3, which does not contain the keyword "dog" at all. Having identified at least one range in each respective group for respective documents 1, 2 and 4, each of these documents is identified as being found by the searching.

At step 34, a determination is made whether the query includes any further keywords. If so, then at step 35, the set of ranges for the document is replaced by the group of ranges. Once the group of ranges replaces the set, the group of ranges is cleared (i.e., its members are all deleted). Then, steps 13–26 are repeated for each additional keyword in the query. Each time step 35 is executed, the adjusted ranges in the group are processed further, instead of working with the individual attribute values that were considered while adjusting the test ranges.

When there are no more keywords at step 34, step 40 is executed. At step 40, all of the documents are checked. For each document, at step 42 a determination is made whether the respective group of ranges corresponding to that document includes at least one range. If so, then at step 44, the document is reported by the query. Otherwise, if there are no ranges in the group corresponding to the document, then the document is not reported by the query. This operation is repeated until all of the documents are checked. After all of the documents have been checked, execution ends at step 46.

The above method may be extended to queries including any number of keywords. For example, using the same data in Table 1, a query for all documents that include the keywords "dog", "cat" and "ant" within five words of one another may be answered. It will further be understood that the technique of defining the boundary of a range and testing whether a tuple that satisfies a proximity query lies within the boundary may be applied to proximity searches involving more than one dimension, as explained in the detailed description below.

DETAILED DESCRIPTION

Before describing the exemplary embodiment of FIG. 1 in greater detail, reference is made to a technically simple but computationally intensive algorithm for performing a multiple keyword proximity search. Steps 300 through 318 in Table 2, below, are pseudocode for an algorithm that checks each combination (tuple) of all of the keywords for each document. If there are more than 2 keywords, the position of each keyword is compared to the position of every other keyword in the tuple.

TABLE 2

| | Pseudocode |
|---|---|
| 300 | For each document |
| 302 | For each value V1 of keyword 1 |
| 304 | For each value V2 of keyword 2 |
| | ... |
| 306 | For each value VN of keyword N |

TABLE 2-continued

| | Pseudocode |
|---|---|
| 308 | If $\bigwedge_{i,j=1,...n, i>j} \mid distance(Vi, Vj) \mid \leq r$ |
| 310 | n-tuple <V1,V2,...,VN> satisfies query |
| 312 | Next |
| 314 | Next |
| 316 | Next |
| 318 | Next |

For example, if there are N keywords, then for each N keyword tuple, the number of pairwise comparisons between keyword positions is equal to $[N*(N-1)]/2$. If there are L occurrences for each keyword within a document, then there are $L^N$ tuples, or combinations, that include one position for each keyword. For each document, the number of pairwise comparisons is then equal to $L^N*N*(N-1)/2$. This number of comparisons becomes very large if either L or N is large.

The algorithm of Table 2 performs many unnecessary computations because it continues to evaluate the distance between each respective pair of values in the n-tuple, even if the first pair fails the proximity criterion (i.e., even if the distance limit is exceeded by the first pair).

Table 3 is a second set of pseudocode that reduces the number of comparisons performed for each document. At each level from 1 to n, the procedure determines if a value Vi is within the maximum distance from all the previous values V1, V2, ... Vi–1 for the tuple <V1, V2, ..., Vi>. If this condition is satisfied, then the tuple <V1, V2, ... Vi> is provided for comparison at the i+1 level. If the tuple <V1, V2, ..., Vi> does not satisfy the proximity criterion, then this tuple is not processed further, and all n-tuples <V1, V2, ... Vi, ..., VN> are identified as not satisfying the query.

TABLE 3

| | Pseudocode |
|---|---|
| 400 | begin (*Evaluate entire query pipeline starting at the top node (node n).*) |
| 402 | repeat |
| 404 | output tuple ← Get Next Tuple [n] |
| 406 | until output tuple = nil |
| 408 | end |
| 420 | procedure Get Next Tuple [node I] |
| 422 | begin (* pipelines the nested loop join & evaluates proximity query*) |
| 424 | tuple found, done ← false |
| 426 | while not (tuple found or done) |
| 428 | begin (* if end of inner stream, then reset stream & get new tuple from outer stream*) |
| 430 | if End of Stream[i] then |
| 432 | begin |
| 434 | Vi ← First in Stream[Ki] (* reset stream and get next tuple*) |
| 436 | if i=2 then (* get next tuple from outer stream*) |
| 438 | $t_{outer}$ ← Next in Stream [K1] |
| 440 | else |
| 442 | $t_{outer}$ ← Get Next Tuple[i–1] |
| 444 | end |
| 446 | else (* not end of inner stream. Just get next tuple from inner stream*) |
| 448 | Vi←Next In Stream[Ki] (*check if outer stream is entirely processed*) |
| 450 | if $t_{outer}$ = nil then done←true |
| 452 | else |
| 454 | begin (*given tuple $t_{outer}$ and object Vi, check join condition*) |
| 456 | if $\bigwedge_{\forall Vj \in\ t_{outer}} \mid distance\ (Vi, Vj) \mid \leq r$ then |
| 458 | tuple found ←true |
| 460 | end |
| 462 | end |

TABLE 3-continued

| | Pseudocode |
|---|---|
| 464 | if tuple found then |
| 466 | return (Build Composite Tuple ($t_{outer}$, Vi)) |
| 468 | else |
| 470 | return (nil) |
| 472 | end |

In Table 3, Procedure Get Next Tuple (steps 420–472) is a pipelined version of the nested loop join algorithm. The proximity condition for the join is coded into the procedure. The procedure assumes that the internal nodes of the query pipeline are labeled 2 to n, where the root has the label n and the leaf nodes correspond to the input streams K1, ... Kn (attributes). The procedure calls itself recursively for each internal node of the query pipeline (corresponding to attributes 2 through n). At level i, the procedure performs a nested loop join operation for the streams K1, ..., Ki. The procedure is recursively called to generate a candidate tuple $t_{outer}$. Each tuple that is generated at level i–1 is compared to all attribute values in the stream Ki.

One skilled in the art of programming DBMS search utilities would understand that the number of computations is reduced in the algorithm of Table 3, by discontinuing the pairwise comparisons for any n-tuple when the first pair of values are identified that do not satisfy the proximity criterion. However, for each complete n-tuple that satisfies the proximity criterion, this algorithm still involves N*(N–1)/2 pairwise computations. The inventors have determined that the approximate number of computations performed with this algorithm is given by equations (1) and (2).

$$NC = L^2 * \frac{(N-1)*(A*L)^N - N*(A*L)^{N-1} + 1}{(A*L-1)^2}, A*L \neq 1 \quad (1)$$

$$= N * (N-1) * L^2/2, A*L = 1 \quad (2)$$

where:

NC=the total number of times the distance function is evaluated.

A=is the fraction of the possible pairwise combinations of keywords that satisfy the proximity condition at a given level.

N=number of attributes (e.g., keywords)

L=number of values of each attribute, for each object (e.g., number of occurrences of a keyword per document)

According to an aspect of the invention, one may reduce the number of pairwise computations further still using an enhanced version of the method of Table 3. Instead of propagating each partial tuple <V1, V2, ... Vi> up the "pipeline" until a tuple is found that satisfies the query, the boundary of a region is propagated up the "pipeline", and each value is compared to the boundary. Given a value V1 for the first keyword, a range R1 is defined such that V1 is included in range R1. For the values V2 of the second keyword, a new range R2 is defined as a function of R1, such that V1 and V2 are in R1 if the query is satisfied. At each additional level, the range $R_n$ is determined as a function of $R_{n-1}$.

Referring again to FIG. 1, the keyword search may be extended from two keywords to any number of keywords. The next example is a query for three keywords "dog", "cat" and "ant", within a defined maximum distance from one another. The process begins by executing the two keyword query of steps 10–26, as described above. At the completion of comparing the positions of "cat" to the ranges established for "dog", the sets of ranges are summarized in Table 4.

TABLE 4

| Ranges Including First & Second Keywords | |
|---|---|
| Document | Ranges |
| 1 | (18, 20) |
| 2 | (27, 30) and (30, 33) |
| 3 | no ranges |
| 4 | (130, 131) |

At step 34, at the completion of the two keyword search, a determination is made whether the query includes any further keywords. In this example, at step 35, once the positions of the second keyword "cat" have been tested against the sets of ranges, each group of ranges listed in Table 4 replaces the respective set of ranges for its respective document. Then steps 14–26 are repeated for the third keyword, "ant".

The positions (values) of the third keyword, "ant", are compared to this set of ranges. At step 18, the position 15 for ant is compared to test range (18, 20) for document 1. At step 20, test range (18, 20) does not include the position of "ant", namely 15. Therefore, at step 22, the test range is adjusted to (15, 20). For document 1, test range (15, 20) includes all three keywords. It will be understood that this determination is made not by comparing the individual positions of "dog", "cat" and "ant", but by expanding the test range from (18, 20) (which is known to include "dog" and "cat") to a wider range that includes the position of "ant". At step 24, the difference between 15 and 20 satisfies the proximity criterion of five words maximum separation, so at step 26, the range (15, 20) may be added to a new group of ranges for document 1. As a result, there is a range (15, 20) in the new group for document 1, so document 1 is determined to satisfy the three keyword query.

It is not necessary to identify the specific positions of the keywords "cat" and "dog" within each of the ranges in Table 4. Only the boundaries of the range are needed. The range may then be "expanded" (i.e., replaced by a broader test range) by decreasing the minimum value of the range or increasing the maximum value of the range to include a third keyword, so long as the minimum and maximum values of the test range do not differ by more than the maximum distance after the range is expanded.

Six test ranges are constructed for document 2, between pairs that encompass one of the ranges (27, 30) and (30, 33) for "dog" and "cat" and one of the three positions in document 2 for "ant". These include (19, 30), (19, 33), (27, 34), (30, 34), (27, 112) and (30, 112). Only (30, 34) satisfies the proximity criterion, so (30, 34) is the only range in the new group for document 2 that satisfies the three keyword query.

For document 4, two test ranges are formed by expanding the range (130, 131) to include "ant". Again, it is not necessary to compare the "ant" position to the individual positions of "dog" and "cat". It is only necessary to establish a test range that dominates (i.e., is broader than) the range (130, 131) and includes "ant". Both of the possible test ranges (104, 131) and (130, 150) that include all three keywords fail to satisfy the proximity criterion, so document 4 does not satisfy the query. That is, no range is saved in the new group of ranges for document 4.

The results of the three keyword query are summarized in Table 5.

TABLE 5

| Ranges Including All Three Keywords | | |
|---|---|---|
| Document | Ranges | Satisfy Query |
| 1 | (15, 20) | Y |
| 2 | (30, 34) | Y |
| 3 | no ranges | N |
| 4 | no ranges | N |

It will be understood by one skilled in the art that the same process can be repeated for any number of keywords, by repeating step 35 and 13 to 26 for each keyword. As each additional keyword is checked, a new range is identified that (1) includes all keywords checked thus far and (2) satisfies the proximity criterion, or the document is omitted from checking against any additional keywords.

Figure 2:
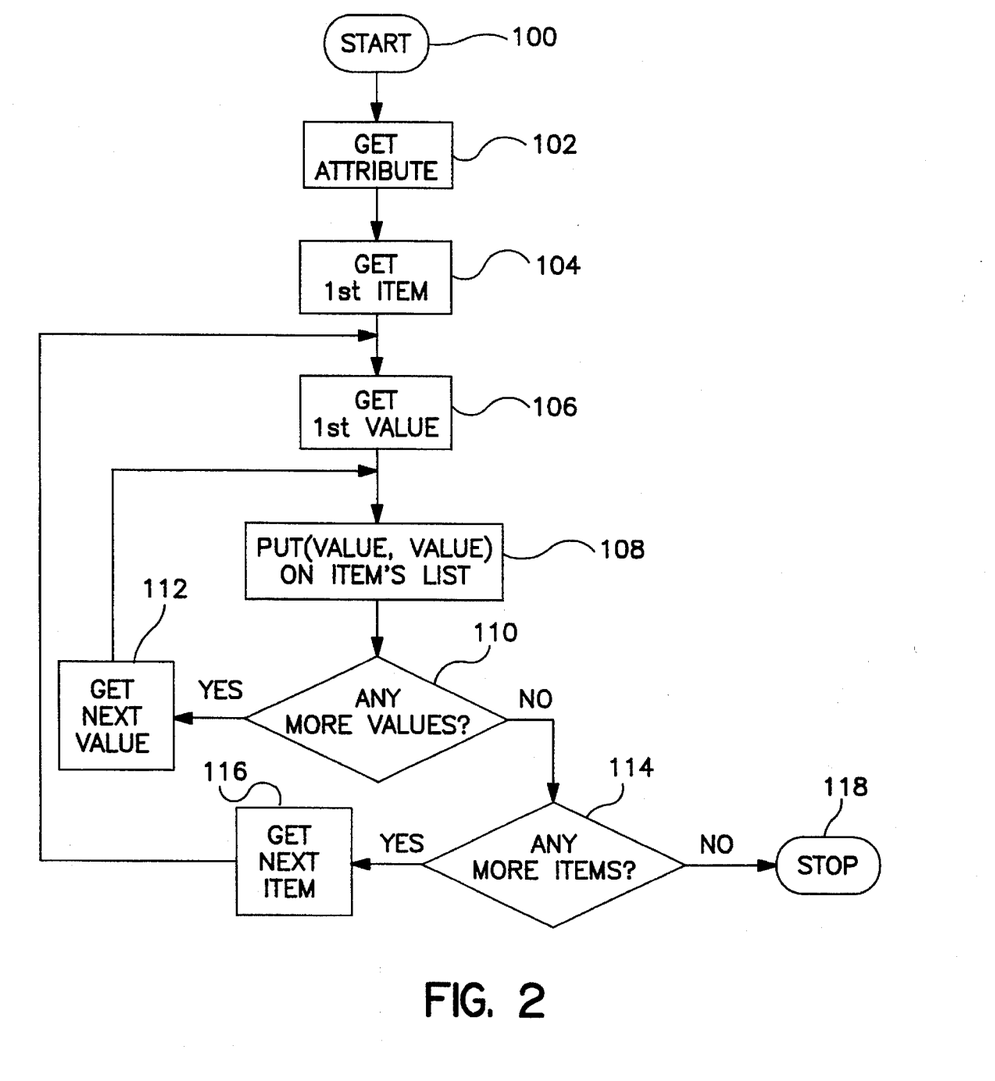
FIGS. 2 and 3 are generalized flow chart diagrams of an exemplary method of a generalized proximity search method.
Figure 3:
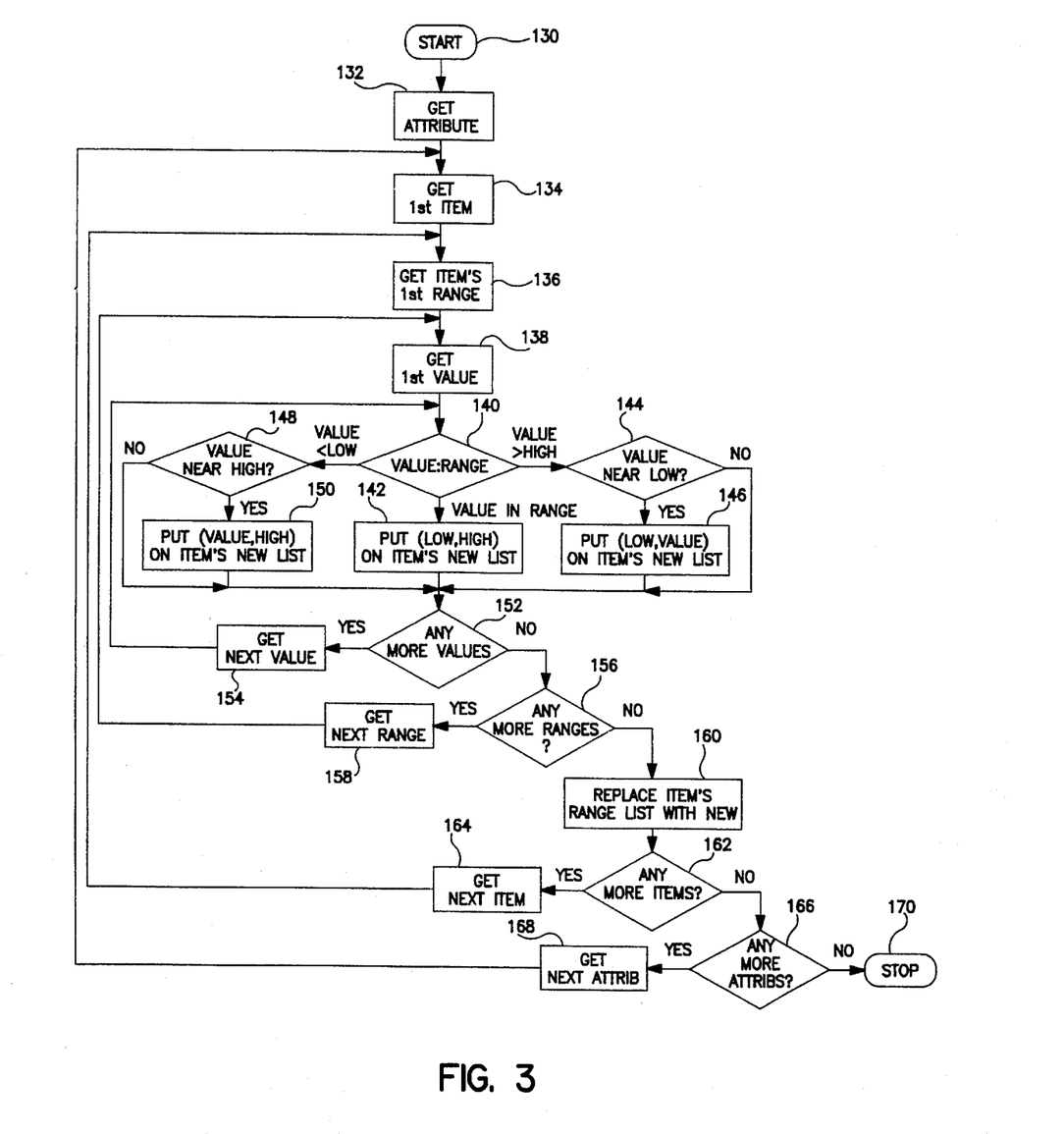

FIGS. 2 and 3 are detailed flow chart diagrams of the generalized method of proximity searching according to the invention. In FIGS. 2 and 3, the word "ITEM" appears in several places. It will be understood by one skilled in the art that the term "ITEM" in FIGS. 2 and 3 has the same meaning as "object" in the description above. Thus, an ITEM is a document, person, or other entity having quantifiable attributes.

FIG. 2 is a detailed flow chart of step 12 of FIG. 1, which is the process for establishing the set of ranges for each respective object. At step 102 of FIG. 2, the first attribute is fetched. Although the attribute in the example of FIG. 1 are keywords, in the exemplary embodiment of FIG. 2, the attribute may be a keyword, a physical location, a temperature, time, or other quantifiable attribute. At step 104, the first object is fetched. Although the objects in the example of FIG. 1 are documents, the items (objects) in the embodiment of FIG. 2 may be any physical entity that has quantifiable attributes. For example, an object may be a building, a region on a map, a person, a star, a galaxy, etc.

At step 106, the first value of the first attribute is fetched. At step 108, a range is defined having both its lower and upper boundaries set equal to the first value of the first attribute. This range is added to the set or list of ranges for the first object. At step 110, if the first attribute of the first object has more than one value, then at step 112, the next value of the first attribute is fetched, and steps 108 and 110 are repeated until there are no more values for the first attribute of the first object. The set of ranges thus determined for the first object is then stored in a storage medium.

At step 114, a determination is made whether there are any further items (objects). If so, then at step 116, the next object is fetched and steps 106 through 114 are repeated for each additional object, until a respective set of ranges has been established for each respective object.

FIG. 3 is a detailed flow chart showing (1) how the ranges are adjusted, and (2) how the objects that satisfy the query are identified for the objects and attributes shown in FIG. 2.

At step 132 of FIG. 3, the first attribute is fetched. At step 134, the first object is fetched. At step 136 the first range is fetched from the set of ranges corresponding to the fetched object, as a test range. At step 138, the first value of the second attribute is fetched. At steps 140–150, the value of the second attribute is compared to the test range.

If the value is within the range at step 140, then at step 142, the range is copied from the set to the new list (group) of ranges for that object. If the value is greater than the maximum value of the range at step 140, then at step 144, the value of the second attribute is compared to the minimum value of the test range. At step 144, if the difference between the second attribute value and the minimum value of the range is less than or equal to the maximum difference value, then at step 146, the maximum value of the test range is set to the value of the second attribute.

One skilled in the art will understand that steps 144 and 146 may be replaced by equivalent steps without altering their functions. For example, in steps 144 and 146, if the value is outside of the test range: (1) the value of the second attribute is compared to the range minimum value; and (2) a test range is created and is adjusted to include the value only if the proximity criterion is satisfied; and (3) the test range is stored in the new group.

The same result is achieved by a process in which: (4) the test range is always created, and is always adjusted to include the value if the value is outside of the test range; (5) the difference between the maximum and minimum values of the adjusted test range is compared to the maximum difference value; and (6) the adjusted test range is only added to the new group if the proximity criterion is satisfied. Steps (4)–(6) are described above with reference to FIG. 1.

Another method that may be used is: (7) adjusting the test range if the proximity criterion is satisfied; and (8) saving the test range in the set of ranges instead of maintaining a distinct new group of ranges. However, using steps (7) and (8) may result in missing an object that satisfies the query.

An example of a situation in which steps (7) and (8) would miss an object is provided above with respect to document 2. When range (30, 30) from the set of the first attribute "dog" is compared to value 27 for the second attribute "cat", a new range (27, 30) results. On a subsequent comparison between the original range and the second attribute value 33, another new range (30, 33) results. If, however, range (27, 30) replaced (30, 30) in the original set, then a subsequent comparison to the value 33 would result in an expanded range (27, 33) that would not satisfy the proximity criterion. The extra range (30, 33) turns out to be important in the above example, because it is subsequently expanded to the range (30, 34) during the comparison with the values of the third attribute. It is for this reason that the exemplary embodiments refer to creating a new group or list of ranges to replace the set, instead of adjusting the ranges in the set.

Referring again to FIG. 3, at step 140, if the value of the second attribute is less than the minimum value of the test range, step 148 is executed. At step 148 if the value of the second attribute differs from the maximum value of the test range by a number less than or equal to the maximum difference value, then at step 150, a new range having the value of the second attribute as its minimum value and the same maximum value as the test range is stored in the group of ranges (referred to in FIG. 3 as the "ITEM'S NEW LIST").

Step 152 determines whether any more values of the second attribute remain to be checked against the current range. If so, then at step 154, the next value of the second attribute is fetched, and steps 140–150 are repeated until there are no more values of the second attribute.

When there are no more values, then step 156 determines whether there are any more ranges in the set of ranges for the document being checked. If so, then at step 158, the next range in the set is fetched, and steps 138–152 are repeated for each range in the set.

When there are no more ranges in the set, then at step 160 the members of the group of ranges replace the members of the set of ranges for the object. Once the ranges in the group replace the ranges in the set, the group of ranges is cleared on the $N-1^{th}$ attribute. When there are no more attributes to be compared, then the query processing is completed.

Table 6 provides pseudocode for implementing the above algorithm. The procedure Get Next Tuple2 [node n] maintains an interval for each qualifying tuple. In the pseudocode, the "inner stream" designates the attribute values Vi, and the "outer stream" designates the range [i−1] to which the values Vi are compared. Ki are the $i^{th}$ attributes.

TABLE 6

Pseudocode for Exemplary Embodiment

```
500    begin (*Evaluate entire query pipeline starting at the top node (node n)*)
502       repeat
504          output tuple ←Get Next Tuple2[n]
506       until output tuple = nil
508    end
510    procedure Get Next Tuple2[node i]
512    begin (*pipelines the nested loop join and evaluates proximity query*)
514       tuple found, done ← false
516       while not (tuple found or done)
518          begin (*if end of inner stream, then reset stream and get next tuple
                    from outer stream*)
520             if End of Stream [i] then
522             begin
524                Vi←First in Stream[Ki] (*reset stream and get next tuple*)
526                if i=2 then
528                   t_outer ←Next in Stream[K1]
530                else
532                   t_outer ←Get Next Tuple2[i−1]
534                end
536             else (*not end of inner stream. Just get next tuple from
                    inner stream*)
538                Vi←Next in Stream[Ki]
                   (*check if outer stream is entirely processed*)
540             if t_outer = nil then done← true
542             else
544             begin
546                (* given tuple t_outer and object Vi check new join condition*)
548                pl←left boundary of interval in t_outer
550                pr←right boundary of interval in t_outer
552                if distance (Vi, pl)≦r    distance(Vi, pr)≦r then
554                   tuple found←true
556             end
558          end
560          if tuple found then
562          begin
564             tout←Build Composite Tuple (t_outer, Vi)
                (*update interval in tout *)
566             if pos(Vi) < pos(pl) then pl←Vi
568             else if pos(Vi) > pos(pr) then pr←Vi
570             return(tout)
572          end
574          else
576             return (nil)
578    end
``` by deleting all ranges from the group. For example if the group is implemented as a set of pointers, (one pointer for each range), each pointer having a valid bit, the valid bits for all of the pointers may be reset to zero.

Thus, the individual values of the first and second attribute are no longer propagated through the proximity search. Only the boundaries of the adjusted set of ranges are retained. At step 162, a check is made as to whether any more objects are to be tested. If so, then at step 164, the next object is fetched, and steps 136–160 are repeated for each object in the set.

When there are no more objects left to be searched, step 166 determines whether there are any more attributes listed in the query. If so, then at step 168, the next attribute is fetched, and steps 134–162 are repeated for each $N^{th}$ attribute, comparing the values of the $N^{th}$ attribute to the group of ranges produced while performing the comparison The inventors have determined that, using the exemplary method of Table 6, the number of times the distance function is evaluated is approximated by equations (3) and (4).

$$NC = L^2 * \frac{2*(A*L)^{N-1} + A*(A*L)^{N-2} - A*L - A - 1}{A*L - 1}, \quad (3)$$

if $A*L \neq 1$ $$= (2*N - 3)*L^2 + (N - 2)*L, \text{ if } A*L = 1 \quad (4)$$

where:

NC=the total number of times the distance function is evaluated.

A=is the fraction of the possible pairwise combinations of keywords that satisfy the proximity condition at a given level.

N=number of attributes (e.g., keywords)

L=number of values of each attribute, for each object (e.g., number of occurrences of a keyword per document)

By only propagating the range boundaries to the next stage of comparing (for the next attribute, e.g., keyword), the number of comparisons required is reduced significantly when compared to the technique of Table 2, which includes pairwise comparison of each occurrence of each keyword against each occurrence of every other keyword in the same document.

Although the exemplary embodiments of FIGS. 1–3 are applied for one dimensional proximity searching, it is also contemplated that the invention may be extended to perform multi-dimensional proximity queries. The attributes of the objects in the database are defined by vector (or tensor) values. For example the attributes may define location with respect to two or three orthogonal axes.

The method discussed below with reference to FIG. 6 may be applied to a variety of multi-dimensional database queries. For example, in a geographical database which contains the coordinates of buildings, schools, libraries, sport facilities, etc., a query might interrogate which shopping centers, libraries and schools are within r kilometers of each other. In this case, the buildings are objects, the type of building is an attribute, and the location of a building may be specified as a vector value. The location may be specified by a two dimensional vector value (for a substantially planar region), or as a three dimensional vector value, taking altitude and the curvature of the earth into account.

As a further example, the method may be used to query a medical database containing three dimensional data of a patient's body. Body parts are objects. The type of body part (e.g., nerves, major blood vessels) is the attribute. The location of the object is specified in three dimensional space. The query may be directed to brain subsystems that have a nerve and major blood vessel within r millimeters from each other.

The number of dimensions need not be limited to three. For example, the objects may be mechanical structures. Each attribute may be the stress tensor (defined as a 3 row by 3 column array) at a respectively different point in one of the structures. The query may be directed to structures in which the stresses (with respect to a predetermined set of axes) do not vary by more than a predetermined maximum value throughout the structure.

In extending the present invention to multiple dimensions, small changes are made in the algorithm for adjusting the test ranges, as described below. Before describing the multidimensional method in detail, reference is first made to a variation of the one-dimensional search method.

In the one-dimensional case, the process of adjusting the test range may essentially be performed by the step of finding the intersection between a first range defined by the value of the first attribute plus/minus a radius (the maximum difference) and a second range defined by the value of the second attribute plus/minus the radius. The first and second ranges each define line segments along the same line, and consequently, the intersection of the two ranges also defines a line segment. The upper and lower limits of this range satisfy the proximity criterion (i.e., they differ by a number less than or equal to the maximum difference).

Using the method described above for finding the intersection of line segments, each range is initialized to the largest possible range (twice the maximum difference), and is progressively decreased to include more values without violating the proximity limit. This method differs from steps 18–26 in the exemplary embodiment of FIGS. 1–3, in which each range is initially defined as a point, and each range is progressively enlarged to include more values, subject to the proximity limit.

Figure 4A:
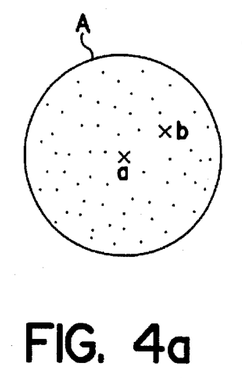
FIGS. 4a–4c are Ven diagrams showing an exemplary two dimensional proximity test.
Figure 4B:
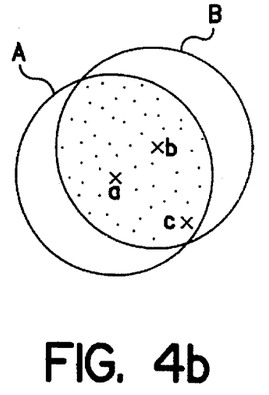
Figure 4C:
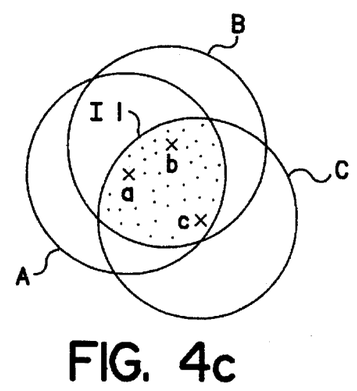

FIGS. 4a–4c are Ven diagrams showing a possible method for extending the range intersection method to two dimensions. Points a, b and c represent values of first, second and third attributes respectively. The proximity limit defines circles A, B and C of radius r around points a, b and c, respectively. The points a, b and c satisfy the proximity criterion if all three points lie within the intersection I1 (shown in FIG. 4c) of the respective circles A, B and C that surround each point. Similarly, if the algorithm is extended to three dimensions (not shown), the proximity limit is met if all the points lie within the intersection of a plurality of spheres constructed about the values of each attribute.

It is not computationally practical to implement this algorithm in two or more dimensions because the intersection of a plurality of circles is a complex shape, and is not defined by a circle. Similarly, the intersection of a plurality of spheres is not a sphere, but is a complex contour.

Figure 5A:
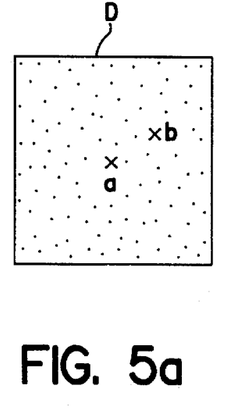
FIGS. 5a–5c are Ven diagrams showing a further two dimensional proximity test according to the invention.
Figure 5B:
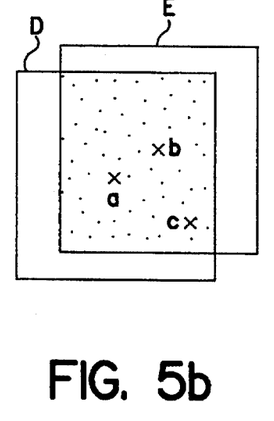
Figure 5C:
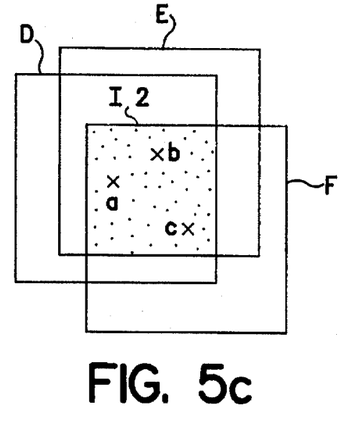

FIGS. 5a–5c are Ven diagrams showing how the exemplary method is applied in a two dimensional case using rectangular boundaries. In this case, a range is defined for each respective point a, b and c, by constructing a respective rectangle centered about the point. The sides of rectangle D are defined by the location of point a, plus/minus the maximum distance r. Rectangles E and F are similarly formed about respective points b and c. The intersection I2 of the three rectangles (shown in FIG. 5c) satisfies the proximity. criterion for all three points.

The method of FIGS. 5a–5c is chosen to maintain a constant number of comparisons at each stage of the processing "pipeline". The advantage of using rectangles, instead of circles, is that the intersection of a plurality of rectangles defined on an orthogonal coordinate system is still a rectangle I2 (as best seen in FIG. 5c). Furthermore, for a D-dimensional query, a set of hyper rectangles is used to apply the method to any number D of dimensions.

Figure 6:
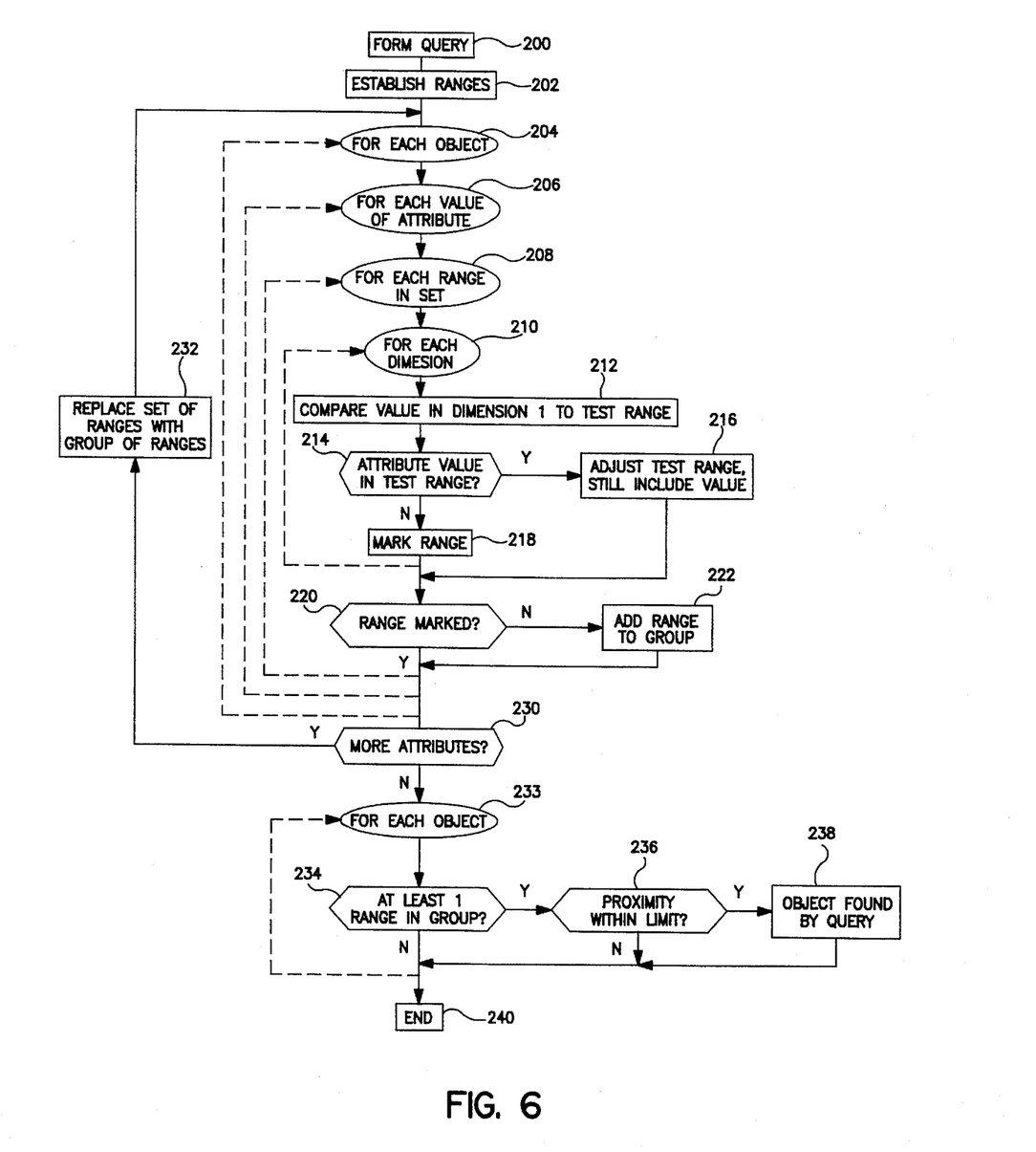
FIG. 6 is a flow chart diagram showing a method for performing the proximity test of FIGS. 5a–5c.

FIG. 6 is a flow chart diagram showing the application of this method. In this example, each object has attributes that are defined by vector values. Each vector value has a number of coordinates D corresponding to the respective D dimensions. At step 200, a query is formed. The query includes at least two of the plurality of attributes and a maximum difference value r, as in the one dimensional case.

At step 202, the ranges are established based on each vector value of the first attribute. The plurality of ranges comprises a set of ranges for each respective object having at least one vector value for a first one of the plurality of attributes. For D dimensions, each range includes a pair of values for each respective one of the D dimensions. Each pair consists of minimum and maximum values for the attribute in the respective dimension. Thus for a three dimensional attribute such as location in space, a range includes six values: three minimum values and three maximum values.

For the multi-dimensional case, the initial ranges are constructed by taking each $i^{th}$ coordinate of each vector value of the first attribute, and adding the maximum difference value to produce the $i^{th}$ maximum value. Similarly, the maximum difference value is subtracted from the $i^{th}$ coordinate of the vector value to produce the $i^{th}$ minimum value. Thus, for each value of the first attribute, a hyper rectangle is established having D minimum values and D maximum values. The total extent of the range in each direction is twice the maximum difference value. This means that adjusting the ranges does not increase the size of the range. A range either keeps the same size or grows smaller as each level of the query pipeline is executed. In this respect, the exemplary multi-dimensional embodiment differs from the exemplary one dimensional embodiment.

In FIG. 6, the comparisons are performed using loops executed at steps 204, 206 and 208, similar to the loops used in the embodiment of FIG. 1. An additional inner loop is used in the multi-dimensional example. At step 210, the steps of comparing and adjusting test ranges are repeated for each dimension.

In the following description, i designates the index of the dimension, and j indicates the index of an attribute. Referring again to FIG. 6, at step 212, the comparison is performed for the $i^{th}$ dimension. At step 214, a determination is made whether the $i^{th}$ coordinate of the $j^{th}$ attribute vector value lies within the range between the $j-1^{th}$ level minimum and maximum $i^{th}$ coordinates for one of the attribute j vector values. At step 218, if the $j^{th}$ attribute vector value does not lie within the $i^{th}$ range (for any value of i between 1 and D), then the proximity test is failed, and the $j^{th}$ attribute value cannot be combined with the j−1 level tuple (V1, V2, ... Vj−1) to form a j-tuple (V1, . . . Vj) that satisfies the proximity criterion at level j. The range is marked.

If, at step 214, the $i^{th}$ coordinate of the $j^{th}$ attribute vector value lies within the $j-1^{th}$ range (i.e., between the $j-1^{th}$ minimum and maximum $i^{th}$ coordinates), one of the $i^{th}$ coordinates of the range is adjusted at step 216. Following the adjustment, the $i^{th}$ minimum and maximum values each differ from the $i^{th}$ coordinate of the vector value of the $j^{th}$ attribute by a number that is less than or equal to the maximum difference value r.

Step 216 comprises the following sub-steps: in each $i^{th}$ dimension, if the $i^{th}$ coordinate of the vector value of the $j^{th}$ attribute is less than or equal to the $i^{th}$ lower limit of the range plus the maximum difference (i.e., if the value is in the lower half of the range), then the $i^{th}$ maximum value of the range is reduced to the minimum of either (1) the current $i^{th}$ maximum value, or (2) the value of the $j^{th}$ attribute plus the maximum difference value. If the $i^{th}$ coordinate of the $j^{th}$ attribute vector value is greater than the $i^{th}$ minimum value plus the maximum difference value (i.e., the value is in the upper half of the range), then the $i^{th}$ minimum of the range is set to the maximum of (1) the $i^{th}$ minimum value, or (2) the $i^{th}$ coordinate of the $j^{th}$ vector value minus the maximum difference value. This is summarized in the pseudocode of Table 7.

TABLE 7

Pseudocode for D Dimensional Comparison

| | |
|---|---|
| 600 | for all i = 1 to D |
| 602 | if Xli + r ≧ Xi then |
| 604 | Xri = min(Xri, Xi + r) |
| 606 | else |
| 608 | Xli = max(Xli, Xi − r) |

In Table 7, Xli is the $i^{th}$ minimum value of the $j-1^{th}$ range. Xri is the $i^{th}$ maximum value of the $j-1^{th}$ range. Xi is the $i^{th}$ value of a vector value of the $j^{th}$ attribute. The value r is the maximum difference value.

Referring again to FIG. 6, at step 220, when the comparison has been performed for all of the values of the $j^{th}$ attribute against the $j-1^{th}$ set of ranges, a determination is made whether the vector value of the $j^{th}$ attribute lies outside the $j-1^{th}$ level range. If the value does not lie outside the range (i.e., the range is not marked), then at step 222, the range is added to the new group of tuples that satisfy the proximity test at the $j^{th}$ level.

At step 230, a check is made to determine whether there are more attributes specified in the query. If there are further attributes, then at step 232, the $j^{th}$ group of ranges replaces the $j-1^{th}$ set of ranges for the comparison with the vector values of the $j+1^{th}$ attribute in the next stage of processing.

At step 233, after all of the attributes in the query are processed, all of the objects are processed and a determination is made at step 234 whether the current object has at least one range in the group of $j^{th}$ level ranges. One skilled in the art will understand that based on the testing thus far, the existence of one or more ranges in the group (or in the $n^{th}$ or final level group) does not necessarily indicate that the candidate tuple satisfies the query. The application of a hyper rectangle test is a screening procedure that eliminates candidate tuples. It is possible that a point falls inside the hyper-rectangle but still does not satisfy the proximity requirement.

For example, given a maximum difference of 1, some points lie within a square having sides of length 2, but are outside of a circle of diameter 2. Points that lie inside the square but outside of the circle still do not meet the proximity requirement. Consequently, at step 236, all candidate tuples that have not been screened out by the hyper rectangle test are evaluated using a Euclidean distance calculation. Such a computation is described by equation (5)

$$\text{distance} = \sum_{i=1}^{D}(Xli - Xi)^2 \leq r^2 \quad (5)$$

The hyper rectangle method of FIG. 6 is executed for levels 1 to j, to screen out objects that fail to satisfy the proximity criterion at any level, before performing the Euclidean distance computation of equation 5. If the proximity criterion is satisfied at step 236, then at step 238, the object is reported as being found by the query.

By use of the hyper rectangle method, most of the tuples that do not satisfy the query are screened out without performing the computationally intensive test of equation (5) for every possible tuple.

It is understood that the definitions of documents as objects, keywords as attributes, and locations as values is for convenience of description. Although these titles may have implications with respect to where the documents, keywords and locations are stored in memory and how the database is indexed by the DBMS, the definitions are not material to the practice of the invention, and do not limit application of the invention.

While the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A method of searching for keywords in a database having a plurality of documents, each including a subset of a plurality of keywords and, for each keyword in the subset, a number of values stored in a storage medium, each value indicating a location of the keyword within the document, the method comprising the steps of:

(a) forming a query specifying first and second keywords and a maximum distance defining a relative range of keyword locations that satisfy the query;

(b) establishing a plurality of ranges, comprising a set of ranges and a group of ranges for each respective document in which the first keyword appears at least once, each set of ranges including a range for each respective location of the first keyword, each range being defined by respective minimum and maximum location values;

(c) repeating, for each respective value of the second keyword in each respective document for which a set of ranges is established, the step of:

(1) repeating, for each one of the set of ranges corresponding to the respective document, the steps of:

(i) establishing a test range having minimum and maximum test values equal to the respective minimum and maximum values of the one range, (ii) adjusting the test range, so that the respective value is included in the test range, if the respective value is not between the minimum and maximum test values, and (iii) adding the test range to the group of ranges corresponding to the respective document if the minimum and maximum test values do not differ from one another by more than the maximum distance after step (ii); and (d) identifying each document for which the respective group of ranges includes at least one range as being found by the searching.

2. A method of searching a database having a plurality of objects, each including a subset of a plurality of attributes and, for each attribute in the subset, a number of values stored in a storage medium, the method comprising the steps of:

(a) forming a query specifying first and second attributes and a maximum difference value defining a relative range of attribute values that satisfy the query;

(b) establishing a plurality of ranges, comprising a set of ranges and a group of ranges for each respective object having at least one value for the first attribute, each set of ranges including a range for each respective value of the first attribute, each range being defined by respective minimum and maximum location values;

(c) repeating, for each respective value of the second attribute of each respective object for which a set of ranges is established, the step of:

(1) repeating, for each one of the set of ranges corresponding to the respective object, the steps of:

(i) establishing a test range having minimum and maximum test values equal to the respective minimum and maximum values of the one range, (ii) adjusting the test range, so that the respective value is included in the test range, if the respective value is not between the minimum and maximum test values, and (iii) adding the test range to the group of ranges corresponding to the respective object if the minimum and maximum test values do not differ from one another by more than the maximum difference value after step (ii); and (d) identifying each object for which the respective group of ranges includes at least one range as being found by the searching.

3. A method according to claim 2, wherein the plurality of attributes includes N attributes designated first through $N^{th}$, where N is an integer, further comprising, between steps (c) and (d) the step of:

(2) repeating, for each respective attribute from the third attribute through the $N^{th}$ attribute of each respective object for which the group of ranges includes at least one range, the steps of:

(A) substituting the group of ranges for the set of ranges, (B) clearing the group of ranges, and, (C) repeating step (c) (1), for the respective attribute.

4. A method according to claim 2, wherein the plurality of attributes includes three attributes, further comprising, between steps (c) and (d) the steps of:

(2) substituting the group of ranges for the set of ranges, (3) clearing the group of ranges, and, (4) repeating step (c) (1), for each respective value of the third attribute.

5. A method according to claim 2, wherein the step of adjusting the one range comprises the steps of:

(i) setting the minimum value equal to the respective value of the second attribute if the value of the second attribute is less than the minimum value and greater than the maximum value minus the maximum difference value, and (ii) setting the maximum value equal to the respective value of the second attribute if the value of the second attribute is greater than the maximum value and less than the minimum value plus the maximum difference value.

6. A method according to claim 2, wherein:

each respective object is a respectively different document, each respective attribute is a respective keyword, and each attribute has a value which indicates a position at which the respective keyword is located within the respective document.

7. A method according to claim 6, wherein each object that satisfies the query includes a respective string of contiguous words, the string including all of the keywords in the plurality of attributes, none of the keywords in the string being separated from any other keyword in the string by a number of words greater than the maximum difference value.

8. A method of searching a database having a plurality of objects, each including a subset of a plurality of attributes and, for each attribute in the subset, a number of values stored in a storage medium, the method comprising the steps of:

(a) forming a query specifying first and second attributes and a maximum difference value defining a relative range of attribute values that satisfy the query;

(b) establishing a plurality of ranges, comprising a set of ranges and a group of ranges for each respective object having at least one value for the first attribute, each set of ranges including a range for each respective value of the first attribute, each range being defined by respective minimum and maximum location values;

(c) repeating, for each respective value of the second attribute of each respective object for which a set of ranges is established, the step of:

(1) repeating, for each one range of the set of ranges corresponding to the respective object, the steps of:

(i) determining whether the respective value is between the respective minimum and maximum values of the one range, (ii) determining whether the respective value differs from either one of the minimum and maximum values of the one range by a number greater than the maximum difference value, if the respective value is not between the respective minimum and maximum values, (iii) establishing a test range such that the respective value is included in the test range, if the respective value is not between the minimum and maximum values of the one range and the respective values does not differ from either one of the minimum and maximum values of the one range by a number greater than the maximum difference value, and     (iv) adding the test range to the group of ranges corresponding to the respective object; and (d) identifying each object for which the respective group of ranges includes at least one range as being found by the searching.

9. A method according to claim 8, wherein step (c) (1) (ii) includes:

(A) setting the minimum value of the test range equal to the respective value of the second attribute, if the value of the second attribute is less than the minimum value and greater than the maximum value minus the maximum difference value, and     (B) setting the maximum value of the test range equal to the respective value of the second attribute if the value of the second attribute is greater than the maximum value and less than the minimum value plus the maximum difference value.

10. A method of searching for objects in a database having a plurality of objects, each object having a plurality of attributes, each attribute having D dimensions, where D is an integer greater than one, and having a non-negative number of vector values that are stored in a storage medium, each vector value comprising D coordinates, the method comprising the steps of:

(a) forming a query specifying at least two of the plurality of attributes and a maximum difference value;

(b) establishing a plurality of ranges, comprising a set of ranges and a group of ranges for each respective object having at least one vector value for a first one of the plurality of attributes, each set of ranges including a respective range for each respective vector value of the first attribute, each respective range comprising a pair of values for each respective one of the D dimensions, each dimension being ordinately numbered first through $D^{th}$, each pair consisting of minimum and maximum values for the attribute in the respective dimension;

(c) repeating, for each respective vector value of a second one of the plurality of attributes, the step of:

(1) repeating, for each respective one of the set of ranges belonging to the respective object to which the respective vector value belongs, the steps of:

(i) establishing a respective test range having values equal to the minimum and maximum values of the range,         (ii) determining whether an $i^{th}$ coordinate of the respective vector value is between the respective $i^{th}$ minimum and $i^{th}$ maximum values of the one range, where i is an integer between one and D,         (iii) adjusting an $i^{th}$ minimum value and an $i^{th}$ maximum value of the test range, such that the $i^{th}$ coordinate of the respective vector value is included in the test range and the $i^{th}$ coordinate of the respective vector value does not differ from either one of the $i^{th}$ minimum and $i^{th}$ maximum values of the one range by a number greater than the maximum difference value,         (iv) marking the test range if the $i^{th}$ coordinate of the respective vector value differs from either one of the $i^{th}$ minimum and $i^{th}$ maximum values of the one range by a number greater than the maximum difference value,         (v) repeating steps (ii) through (iv) for each of the D dimensions;

(2) adding the test range to the respective group of ranges if the test range is not marked and (d) identifying each respective object for which the respective group includes at least one range as a member of a subset of the plurality of objects, whereby all of the objects that satisfy the query are included in the subset.

11. A method according to claim 10, wherein said method further comprises the steps of:

(e) checking, for one of the objects in the subset, whether a combination of vector values exists, such that the combination includes a respective vector value for each respective attribute, and none of the vector values in the combination differs from any other vector value in the combination by a difference greater than the maximum difference value, the checking being performed after step (e); and (f) identifying the one object as satisfying the query if the combination exists.

12. A method according to claim 11, further comprising the step of repeating steps (e) and (f) for each respective object, thereby determining all of the objects that satisfy the query.

13. A method according to claim 10, wherein the number D has a value of 2, each respective object is a respectively different building, each respective attribute is a type of a respective one of the buildings, and each respective vector value represents the location of the one building in two dimensions, wherein each building is at substantially the same altitude as every other building.

14. A method according to claim 10, wherein the number D has a value of 3, each respective object is a respectively different building, each respective attribute is a type of a respective one of the buildings, and each respective vector value represents the location of the one building in three dimensions.

15. A method according to claim 10, wherein the number D has a value of 3, each respective object is a respectively different person, each attribute is a respectively different part of the body of one of the persons, and each respective vector value represents the location of a respective part within the body of the one person.

16. A method according to claim 10, wherein step (c) (1) (iii) includes repeating, for each dimension from the first dimension to the $D^{th}$ dimension, the steps of:

(A) setting the $i^{th}$ maximum value of the test range equal to a minimum value selected from the group consisting of the $i^{th}$ maximum value and the sum of the $i^{th}$ coordinate of the vector value plus the maximum difference value, if the $i^{th}$ coordinate of the vector value is less than the $i^{th}$ minimum value plus the maximum difference value, and     (B) setting the $i^{th}$ minimum value of the test range equal to a maximum value selected from the group consisting of the $i^{th}$ minimum value and the $i^{th}$ coordinate of the vector value minus the maximum difference value, if the $i^{th}$ coordinate of the vector value is not less than the $i^{th}$ minimum value plus the maximum difference value.

\* \* \* \* \*